UNITED STATES PATENT OFFICE.

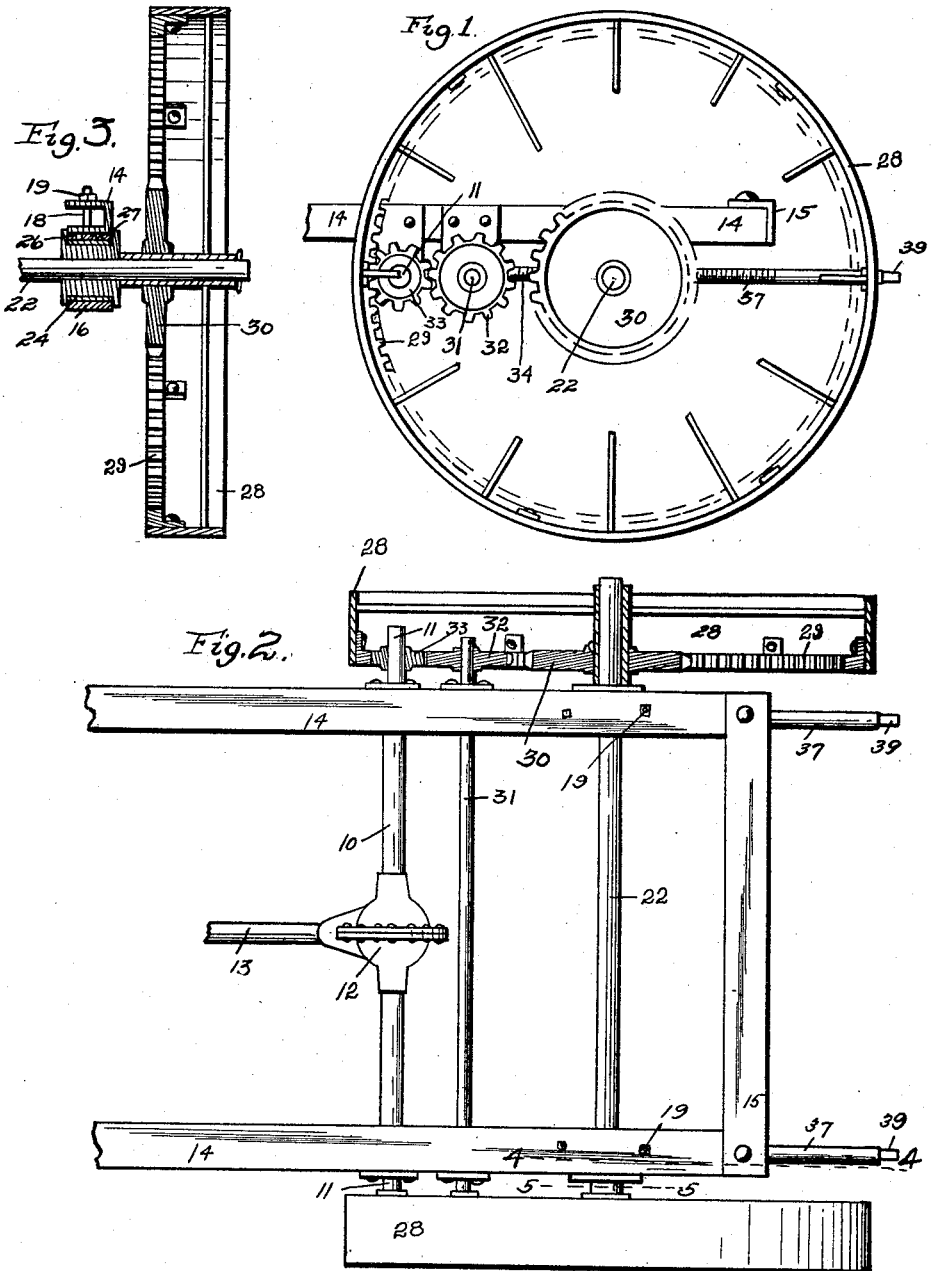

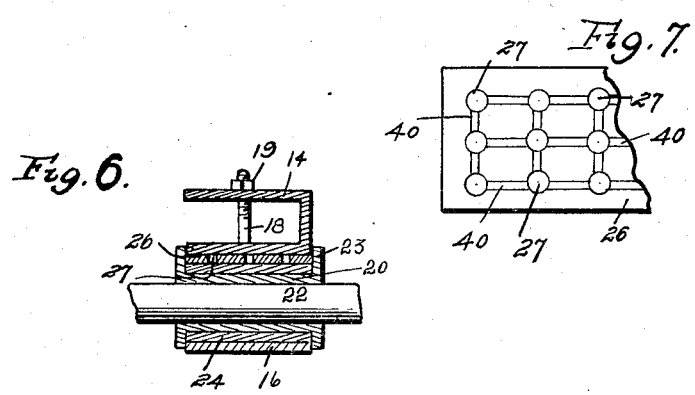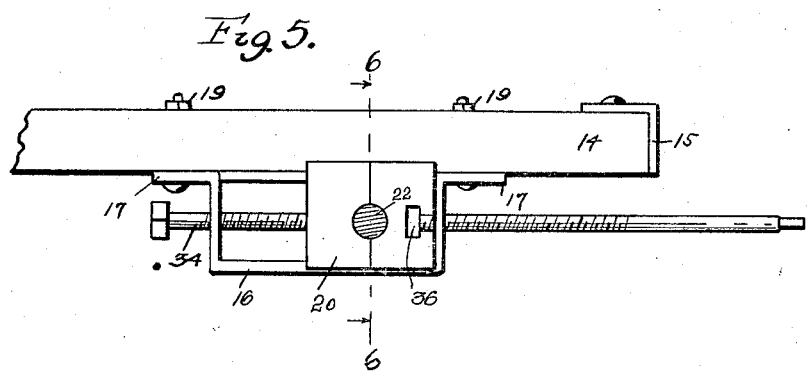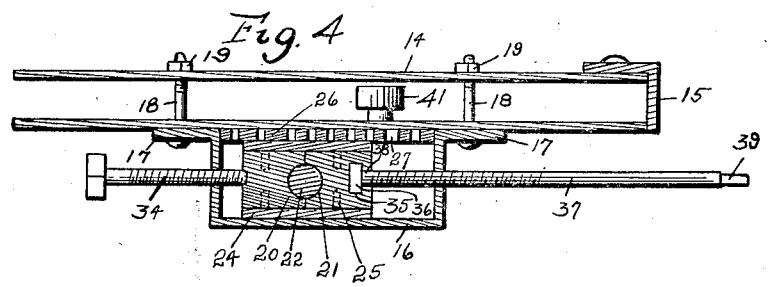

RICHARD W. MEWES, OF DES MOINES, IOWA.

TRACTOR ATTACHMENT.

1,274,574.  Specification of Letters Patent.  Patented Aug. 6, 1918.

Application filed August 9, 1917. Serial No. 185,397.

*To all whom it may concern:*

Be it known that I, RICHARD W. MEWES, a subject of the King of Great Britain, and resident of Des Moines, in the county of Polk and State of Iowa, have invented a certain new and useful Tractor Attachment, of which the following is a specification.

My invention relates to an attachment designed to be mounted on an automobile after the removal of the rear wheels thereof, whereby the automobile may be transformed into a tractor.

The object of my invention is to provide an attachment adapted to be mounted on an automobile after the removal of the rear wheels therefrom, and having tractor wheels and means for operatively connecting said tractor wheels with the power plant of the automobile.

More particularly the object of my invention is to provide such an attachment, including gearing connections between the tractor wheels and the axle of the automobile, so constructed and arranged that the gear ratio between the tractor wheels and the rear axle may be changed for running the tractor wheels at different speeds with relation to the speed of the rear axle.

Still a further object is to provide a simple and efficient method for mounting the traction wheels on the frame of the automobile and to adjust said traction wheels to different positions for making different gear connections between the traction wheels and the rear axle of the automobile and for securing proper lubrication of the moving parts.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of my improved attachment.

Fig. 2 shows a top or plan view of an attachment embodying my invention, one of the traction wheels and gearing members connected therewith being shown in horizontal, central, cross-section.

Fig. 3 shows a transverse, sectional view through one of the tractor wheels and the means for mounting the same on the extra frame.

Fig. 4 shows a vertical, sectional view, taken on the line 4—4 of Fig. 2.

Fig. 5 shows a vertical, sectional view, taken on the line 5—5 of Fig. 2.

Fig. 6 shows a vertical, transverse, sectional view, taken on the line 6—6 of Fig. 5, and Fig. 7 shows a top view of a portion of the lubricating plate.

In the accompanying drawings I have used the reference numeral 10 to indicate generally the housing of the rear axle 11 of an automobile. The numeral 12 indicates the housing for the differential, and the numeral 13 the housing for the main transmission shaft.

My improved attachment comprises an extra frame or the like, including the longitudinally arranged, spaced, inwardly opening channel bars 14, suitably mounted on the axle housing 10 and extending rearwardly therefrom and connected at their rearward ends by a transverse angle bar 15. The rear wheels of the automobile are removed, leaving the spindles of the axles 11 exposed. Mounted preferably on the lower part of each frame member 14 is a guide and supporting device comprising a short upwardly opening channel-shaped member 16, having at its opposite ends at its upper portion longitudinally extending flanges 17 secured to the channel bar frame members 14 by means of bolts 18 and nuts 19.

Mounted in the guide devices 16 to slide longitudinally of the machine, are two-part bearings, each comprising a pair of blocks 20 having in their opposite adjacent faces registering horizontal grooves 21 which receive a transversely arranged axle 22. Each of the bearing block members 20 is provided at its opposite sides with upwardly and outwardly extending flanges 23. The upper flanges 23 receive between them the frame members 14, and the lower flanges 23 receive between them the lower portion of the guide and supporting member 16.

Resting against the upper and lower surfaces, respectively, of the bearing blocks 20, between the flanges thereof, are wear plates 24 which are each connected with both bearing blocks 20 in any suitable way, as for instance, by means of the pins 25, whereby any movement of one of the bearing blocks 20 is instantly communicated to the other bearing block 20, and whereby the bearing blocks 20 are constantly kept in the same relative positions adjacent to each other. The wear plates 24 are of the same length longitudinally of the machine as the bearing blocks 20.

Above the upper wear plate 24 is a lubrication plate or strip 26, extending from one end to the other of the member 16, as shown in Fig. 4, and provided with a plurality of openings 27 to receive and hold lubricant.

Mounted on the outer ends of the shafts 22 are the hubs of traction wheels 28. The traction wheels 28 are provided with rims, on the inner surfaces of which are detachably mounted internal gears 29 preferably made of sections bolted to said rims. Detachably mounted on the hubs of the traction wheels are pinions 30.

Suitably mounted on the frame members 14, rearwardly of the axle 10 and forwardly of the axle 22, is a jack shaft 31, on the ends of which are pinions 32 in mesh with pinions 33 on the ends of the shaft 11.

It is one of the principal purposes of my invention to provide an attachment so constructed and arranged that the large tractor wheels 28 may be adjusted for moving either the gears 29 or the gears 30 into operative connection with the shaft 11. It will be seen that when the gears 33 and 29 are in mesh the tractor wheels will be operated at low speed for securing great power. By moving the tractor wheels forwardly the gears 29 will be moved out of mesh with the gears 33, and the gears 30 will be moved into mesh with the gears 32 for securing greater speed.

For thus shifting the position of the tractor wheels and varying the gear ratio between the tractor wheels and the rear axle, by sliding the bearing block members 20, I have provided the following means.

Screwed into one of the vertical walls of the guide 16 is a screw bolt or rod 34, one end of which is designed to bear against one of the blocks 20. The other block 20 is provided with a slot 35, designed to receive a head or the like 36 on a screw-threaded bolt 37 which is screwed into the other upright end member of the guide 16. The slot 35 has a contracted portion 38 to receive the rod 37, so that the rod 37 is rotatably but nonslidably mounted with relation to the bearing block 20 last mentioned.

Thus it will be seen that if the bearing blocks 20 are in their rearward positions, as shown Fig. 5, where the gears 29 and 33 would be in mesh for heavy work, and it is desired to shift the tractor wheels 28 forwardly for throwing into gear the gears 32 and 30 for lighter work and greater speed, the screw bolt 34 is screwed forwardly for moving it away from the forward bearing block 20. It will be understood in this connection that the operation of each side of the machine is the same. The screw bolt 37 which has at its rear end an angular portion 39 to receive a wrench, is then rotated for screwing it forwardly and forcing the bearing blocks forwardly in the machine. This operation is continued until the gears 32 and 30 mesh properly with each other. When such point is reached, the bolt 34 is screwed rearwardly until its rearward end bears against the forward block 20.

In this connection it may be mentioned that on the rearward movement of the bolt 37 the wear plates 24 which are connected with both of the bearing blocks 20 will draw both of the blocks 20 rearwardly together for carrying with them the shaft 22.

It should also be mentioned in this connection that a great variety of means might be employed for adjusting the bearing blocks forwardly and rearwardly in the machine for changing the gear ratio between the automobile axle and the tractor wheels. The wear plates 24 not only serve the purpose of locking together the bearing blocks 20, but they also serve to take the wear from the bearing blocks 20, and they may be quickly and easily removed for repair or for replacing them after they have become worn.

The lubricating strip 26 is so arranged that by furnishing lubricant thereto the wearing surfaces of the lubricating strip and the upper wear strip will always be properly oiled. The lubricating plate is provided in its upper surface with grooves 40 which connect the holes 27 with each other. Oil is supplied to the top of the plate 26 from a grease cup 41.

Many of the parts of my improved device may be made in a variety of forms. For instance, many ways for shifting the tractor wheels might be adopted which would serve the purpose, and it is my intention to cover by my present application and the patent to be issued thereon, any modified forms of structure or use of mechanical equivalents which may be reasonably included within the scope of my claims.

I claim as my invention:

1. An attachment for automobiles, comprising gearing devices adapted to be mounted on the rear axle of an automobile in place of the rear wheels thereof, an extra frame, an axle mounted thereon, and tractor wheels on said axle, said tractor wheels each having two gears, said tractor wheels being capable of movement, whereby either of the gears of the tractor wheels may be selectively operatively connected with the gears on the automobile axle.

2. In a device of the class described, the combination of an automobile axle with gears mounted thereon in place of the ordinary rear wheels of the automobile, an auxiliary frame designed to be mounted on the automobile, an axle thereon, tractor wheels mounted on said last named axle, said tractor wheels each having two gearing devices, intermediate gearing devices meshing with the gears on said rear automobile axle, and means for adjusting said tractor wheels to different positions, whereby one of the gears on the tractor wheels may be operatively connected with the gears on the automobile rear axle, or the other of the gears on the tractor wheel may be connected with said intermediate gears.

3. In a device of the class described, the combination of an automobile axle with gears mounted thereon in place of the ordinary rear wheels of the automobile, an auxiliary frame designed to be mounted on the automobile, an axle thereon, tractor wheels mounted on said last named axle, said tractor wheels each having two gearing devices, intermediate gearing devices meshing with the gears on said rear automobile axle, and means for adjusting said tractor wheels to different positions, whereby one of the gears on the tractor wheels may be operatively connected with the gears on the automobile rear axle, or the other of the gears on the tractor wheel may be connected with said intermediate gears, said means comprising pairs of bearing blocks for said second shaft, guide devices for said bearing blocks, means for connecting said bearing blocks together, and means for sliding said bearing blocks longitudinally of the machine and for holding them in any of their adjusted positions.

4. In a device of the class described, an attachment comprising a frame having longitudinal side members, guide members mounted thereon, bearing blocks slidably mounted between said guide members and said longitudinal frame members, having at their side edges upwardly and downwardly extending flanges, wear plates above and below said bearing blocks and between the flanges at the upper and lower portions of the blocks respectively, a perforated lubricating plate above the upper wear plate, means for adjusting said bearing blocks longitudinally of the machine, an axle mounted in said bearing blocks, tractor wheels on said axle, and means for operatively connecting said tractor wheels with the rear axle of the automobile.

Des Moines, Iowa, August 1, 1917.

RICHARD W. MEWES.

Copies of this patent may be obtained for five cents each, by addressing the "Commissioner of Patents, Washington, D. C."